Oct. 20, 1959   J. A. RUSSELL   2,909,646
ELECTRODE FEED APPARATUS
Filed Dec. 27, 1957
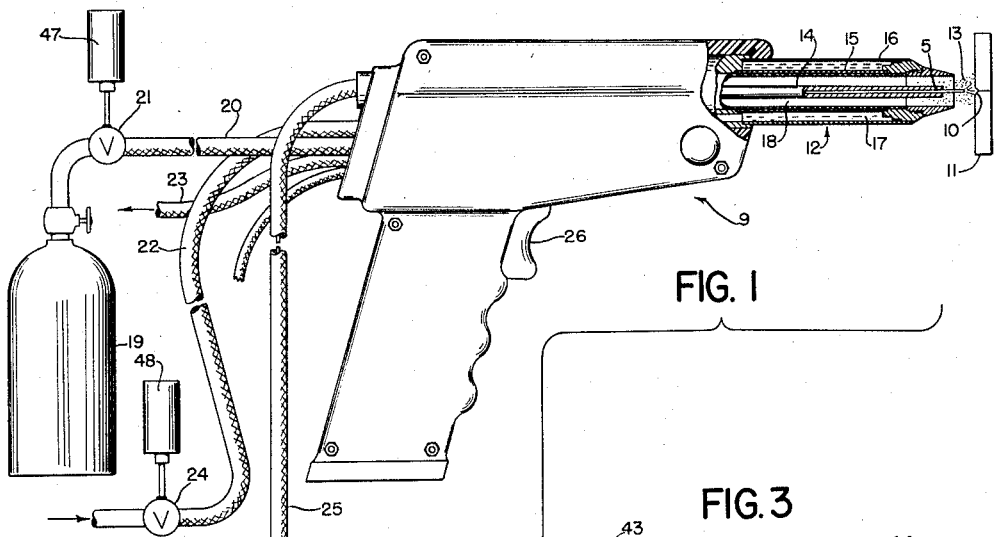
FIG. 1
FIG. 3
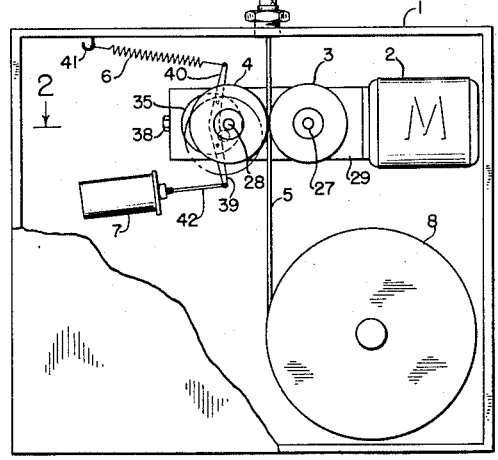
FIG. 2
FIG. 4
INVENTOR.
JOHN A. RUSSELL
BY
Andrus, Sceales + Starke
Attorneys

United States Patent Office 2,909,646
Patented Oct. 20, 1959

2,909,646

ELECTRODE FEED APPARATUS

John A. Russell, Milwaukee, Wis., assignor to A. O. Smith Corporation, Milwaukee, Wis., a corporation of New York Application December 27, 1957, Serial No. 705,648

9 Claims. (Cl. 219—130)

This invention relates to an electrode feed apparatus for feeding a consumable current-carrying electrode to a welding arc and particularly to a means to automatically disengage the feed apparatus from the electrode incident to opening of the welding current supply to prevent continued electrode feed due to the inertia of the feed apparatus.

Generally, in consumable electrode arc welding apparatus the electrode is fed by means of motor driven rolls which grip the electrode to impart translatory motion to it. The speed of the motor and therefore of the rolls may be dependent upon the voltage across the arc which varies with the arc length whereby the motor speed is correspondingly increased or decreased to return the arc length toward a predetermined length. In certain high-current density arc welding processes, the motor speed and therefore the electrode feed is maintained constant with the arc length being inherently maintained constant due to the arc welding current source. When the weld period is terminated or otherwise interrupted, current to the motor is automatically stopped which, in turn, stops further feed of the electrode. However, due to the inertia of the motor, the rolls and coupling mechanism, the feed rolls continue to rotate for a relatively short period causing the electrode to continue to feed to the work. This continued feed causes the electrode to feed beyond the end of the welding apparatus a distance directly dependent upon the inertia of the electrode feed mechanism, and the rate at which the electrode is fed to the weld area. In some cases, the electrode may be extended several inches beyond the end of the welding apparatus and, in others, a distance of a foot or more.

As it is customary to have the electrode projecting approximately one-half inch from the end of the arc-welding apparatus when striking an arc for purposes of convenience and accuracy, it is necessary to cut off a portion of the extended electrode before initiating a subsequent weld. Where the arc-welding apparatus and in particular the portion disposed adjacent the weld area, is not adapted to be moved to divert the electrode from the weld area, the continued electrode feed may also result in the electrode contacting and freezing or sticking to the workpiece, thereby necessitating frequent delays and stoppages between welds. These conditions are particularly prevalent in those applications where the electrode is fed to the work at a relatively high rate of speed.

In general, the apparatus of the invention provides feeding means which are physically disengaged from the electrode as soon as the welding cycle is interrupted or terminated, as the case may be, and thereby prevents continued electrode feed due to the inertia in the feeding mechanism.

In accordance with the present invention, motor driven feed roll means are arranged to selectively grip and feed a consumable electrode toward the work during the welding cycle. Means operatively associated with the feed roll means are provided for temporarily disengaging the latter from the electrode at the termination of the welding cycle to prevent inertia of the feeding means to be transmitted to the electrode. Thus, the electrode motion is effectively halted simultaneously with the termination of the welding cycle.

In accordance with a further aspect of the invention, a timing means is actuated a predetermined period after termination of the cycle to allow the feed roll means to re-engage the electrode prior to a subsequent weld cycle.

A further aspect of the invention provides for the actuation of means for providing shielding gas to the weld area and coolant to the nozzle of the welding head during the welding cycle and for a short time thereafter to purge contaminants from the weld area. When the timing means is actuated to cause the feeding means to re-engage the electrode, the supply of shielding gas and coolant are simultaneously halted.

A principal object of this apparatus is the provision of means for stopping the electrode motion as soon as the welding period is terminated to prevent the electrode from being extended beyond the end of the arc-welding apparatus to the extent that the extended portion of the electrode must be cut before initiating a subsequent weld.

Further objects of the apparatus will appear in the course of the following description.

The drawing illustrates the best mode presently contemplated of carrying out the invention.

In the drawing:

Figure 1 is a diagrammatic view of the invention together with the various components of the welding machine;

Fig. 2 is an enlarged sectional view on lines 2—2 of Fig. 1 of the feed rolls and associated mechanism for operatively engaging and disengaging the rolls and the electrode;

Fig. 3 is a schematic view of the circuit of the apparatus; and

Fig. 4 is an enlarged fragmentary view of Fig. 1 illustrating the feed rolls of the apparatus with the disengaged position of the movable or pressure roll being shown in phantom.

Referring to the drawing, and particularly to Figure 1, a box-like structure 1 encloses and supports an adjustable speed motor 2 which is operably coupled to a drive roll 3 and a pressure roll 4. A consumable electrode 5 is threaded between the rolls 3 and 4 and releasably gripped therebetween by the operating action of a spring 6 and an electrode feed control solenoid 7. Upon energization of the motor 2 and de-energization of solenoid 7, the consumable electrode 5 is fed by the rolls from a reel 8 to and through a welding gun 9 to maintain an arc 10 established between the electrode 5 and a workpiece 11 by current derived from a suitable source of current, not shown.

The welding gun 9 is of any suitable variety and for purposes of illustration is shown and described as the gun set forth in the co-pending application of Julian A. Piekarski and John A. Russell, entitled Arc Welding Apparatus, Serial No. 631,849, filed December 31, 1956, and which has been assigned to a common assignee.

The gun 9 is provided with a water cooled electrode nozzle assembly 12 through which a shielding gas 13 and the electrode 5 are co-axially directed to the weld area. In general, the nozzle assembly 12 is comprised of a contact tube 14 through which electrode 5 passes and a pair of co-axially spaced tubes 15 and 16. These latter tubes are spaced from one another to form a cooling chamber 17 and from the contact tube to form a gas passage 18.

A source of shielding gas 19 is connected to the rear portion of gun 9 by a conduit 20 which is provided with a solenoid control valve 21. Conduit means, not shown, are provided within gun 9 for directing the shielding gas through the gun 9 to the annular gas passage 18 as shown and fully described in the previously referred to co-pending application.

Similarly, the annular cooling chamber 17 is supplied with coolant, such as water, by means of an incoming conduit 22 and a discharge conduit 23 connected to the gun 9 and a suitable source of coolant, not shown. Conduit 22 is also provided with a solenoid control valve 24 or the like. Conduit means, as shown and described more fully in the previously referred to co-pending application, serve to direct the coolant from conduit 22 to chamber 17 and from chamber 17 to the discharge conduit 23.

A flexible, insulating electrode feed cable 25 is mounted at one end on a wall of box 1 in alignment with rolls 3 and 4 to receive the electrode 5 and at the other end on welding gun 9 to guide the traveling electrode to the gun and prevent contact with the workmen and surrounding apparatus. The electrode 5 passes to the workpiece through a tubular wire guide, not shown, which is supported in gun 9 in longitudinal alignment with contact tube 14.

The gun is provided with a trigger switch 26 which is operatively associated with a control circuit, shown in Fig. 3. The circuit, as more fully described hereinafter, simultaneously supplies current to the electrode 5 and to the water and gas solenoid valves 24 and 21 respectively, and disconnects current from the feed-roll solenoid 7 in response to actuation of switch 26 to establish and maintain the arc 10.

Roll 4 is arranged to move relative to roll 3 to selectively grip the electrode 5 therebetween in the following manner. Referring to Figs. 1 and 2 the rolls 3 and 4 are mounted on laterally spaced shafts 27 and 28, respectively. The shafts 27 and 28 are journaled within and extend upwardly from a gear reduction casing 29 which is secured to the motor 2. Shaft 27 is coupled through bevel gears 30 and 31 connected respectively to the shaft 27 and an output shaft 32 of the motor 2 to directly drive the feed roll 3. Mating gears 33 and 34 are secured to the opposite ends of the respective shafts 27 and 28 to drive the shaft 28 and feed roll 4 in an opposite direction with respect to feed roll 3.

In order to disengage pressure roll 4 from the electrode 5 and thus stop the advance of the electrode to the arc 10 and the work 11, the shaft 28 is eccentrically extended through a rotatable cylinder 35 rotatably mounted within a corresponding opening 36 provided in casing 29. The cylinder 35 is provided with an annular recess 37 disposed in alignment with a setscrew 38 which threads through an opening in the casing wall and into the recess to rotatably support the cylinder 35.

Rotation of cylinder 35 causes shaft 28 to move in an arc about the center of rotation of cylinder 35 because of the eccentric mounting of the shaft 28. This, in turn, causes the center of rotation of pressure roll 4, which coincides with the shaft 28 to move relatively toward or away from electrode 5 and toward or away from the center of rotation of drive roll 3. Consequently, the peripheral surface of pressure roll 4 moves into or out of engagement with electrode 5 depending upon the rotational position of cylinder 35.

The rotational position of cylinder 35 is determined by the cooperating action of spring 6 and solenoid 7, as follows. A pair of oppositely extending levers 39 and 40 are welded or otherwise rigidly secured to the bottom portion of cylinder 35. Lever 40 is connected to one end of a coil spring 6, the opposite end of which is secured to casing 1 by a hook 41 or other suitable means. The tension of spring 6 biases the cylinder 35 in a direction to dispose the feed roll 4 in engagement with electrode 5, in a counterclockwise direction as viewed in Fig. 2.

The other lever 39 controlling the position of cylinder 35, is connected to an armature 42 which constitutes a part of solenoid 7 and which is adapted to move toward solenoid 7 upon energization of the same. Movement of armature 42 into solenoid 7 exerts a force on arm 39 which overcomes the force of spring 6 and rotates cylinder 35 clockwise, as shown in Fig. 2. Clockwise rotation of cylinder 35 causes the center of rotation of pressure roll 4 to move away from the center of rotation of drive roll 3 and moves roll 4 out of engagement with electrode 5.

In actual operation, only a small amount of cylinder rotation is required to move roll 4 into and out of operative engagement with electrode 5.

The structure previously described is used in connection with the circuit and controls indicated in Fig. 3 wherein the power is supplied to the welding head controls from lines 43 and 44 from any suitable source, not shown. The manually operable switch 26 on welding gun 9 is normally open and is connected in series with a main control relay winding 45 magnetically coupled to three sets of normally open contacts 45–1, 45–2 and 45–3 and to two sets of normally closed contacts 45–4 and 45–5.

Contacts 45–1 are connected in series with a line contactor 46 in the welding machine, not shown, and complete the circuit to the contactor when relay 45 is energized. Contactor 46 then closes the contacts, not shown, in the power source and a welding potential suitable for striking and maintaining an arc 10 between the electrode 5 and the work 11 is established.

Relay contacts 45–2 are connected in series with drive motor 2 and close upon energization of relay 45 to permit current to flow to motor 2.

Relay contacts 45–3 are connected to one side between the contacts 45–2 and drive motor 2, and at the other side to gas solenoid 47 and water solenoid 48 which are connected in parallel with motor 2 to establish an energizing circuit therefor simultaneously with the motor circuit. When relay contacts 45–2 are closed by the energization of relay 45, the water solenoid 48 and the gas solenoid 47 are energized to open the corresponding valves 24 and 21 in conduits 22 and 20, respectively, and a supply of water and shielding gas to gun 9 is established.

The normally closed relay contacts 45–4 are connected in series with a winding 49 and are opened at the outset of the welding operation by energization of winding 45 to prevent current flow to winding 49. Winding 49 is operatively coupled with a set of timing relay contacts 49–1 through any suitable apparatus adapted to insert a predetermined delay between energization of winding 49 and opening of contacts 49–1. The winding 49 and contacts 49–1 may, for example, constitute the components of a synchronous timer motor unit which continuously drives an arm, not shown, from an initial position toward contacts 49–1 to open the latter after a predetermined period of continuous energization of winding 49.

Normally closed relay contacts 45–5 are connected across power lines 43 and 44 in series with the winding of solenoid 7 and the set of timer contacts 49–1. The solenoid winding 7 is connected directly to power line 44 and to a common pole 50 of a single-pole, double-throw switch 51. Pole 50 is adapted to selectively engage a contact 52 which is connected to one of the contacts 45–5 or a contact 53 which is connected to power line 43. With switch 50 in the automatic position, shown by full lines in Fig. 3, engaging contact 52, solenoid 7 is connected to power line 43 if contacts 45–5 are closed and either contacts 49–1 or the contacts 45–3 and 45–2 are closed. When control relay 45 is energized relay contacts 45–5 open and prevent the energization of solenoid 7. The tension of spring 6 holds pressure roll 4 in position cooperating with feed roll 3 to tightly and firmly grip electrode 5. Thus, with rolls 3 and 4 engaging electrode 5 and current applied to motor 2 as described above, the electrode is rapidly and continuously advanced to the arc 10.

When the operator releases switch 26, control relay 45 is de-energized and allows the associated contacts to revert to their normal position.

Relay contacts 45–1 open to effect the de-energization of line contactor 46 to stop the flow of welding power to the work 11 and to the electrode 5.

Relay contacts 45–2 also open to discontinue the flow of current to motor 2.

Relay contacts 45–4 close upon opening of the switch 26 to complete the circuit to energize winding 49. However, energization of winding 49 does not instantly open normally closed relay contacts 49–1 due to the previously described time delay operation of winding 49. Instead, there is a predetermined delay, for example, five seconds, during which time relay contacts 49–1 remain closed. As shown in Fig. 3, the parallel connected gas solenoid 47 and water solenoid 48 are connected in series with the timing contacts 49–1 across power lines 43 and 44. Therefore, the solenoids 47 and 48 remain energized for the time delay period and maintain the flow of shielding gas and water to the area of the work 11 after the welding has been interrupted or terminated to purge the weld area of contaminants.

When the winding 45 is de-energized the associated contacts 45–5 close and current is supplied to the clutching solenoid 7 through the time delay relay contacts 49–1, contacts 45–5 and switch 51 to open the contacts 49–1. The solenoid 7 rapidly retracts the associated armature 42 and pivots the connected lever 39 to rotate the cylinder 35 which rotates in a clockwise manner as previously described. The shafts 28 and attached roll 4 move away from the electrode 5 because of the eccentric positioning of the shaft 28 within the cylinder 35. Thus, as soon as the welding cycle is terminated or interrupted by opening of the switch 26, the electrode drive mechanism is effectively completely disengaged from the electrode 5. The electrode 5 then immediately stops advancing towards the work despite the fact that drive rolls 3 and 4 normally continue to rotate due to the inertia of motor 2 and its associated gear mechanism, as well as the rolls themselves.

After the timing winding 49 times out, relay contacts 49–1 open to de-energize the solenoids 47 and 48 and shut off the flow of gas and water to the respective conduits 20 and 22 and to de-energize the clutch solenoid 7. The tension of spring 6 which has been increased by the rotation of cylinder 35, rapidly forces lever 40 and the cylinder 35 to rotate counterclockwise and re-engage roll 4 with electrode 5 to return the drive apparatus to standby for subsequent welding operations.

Thereafter, closing of switch 26 to start a subsequent weld cycle, immediately causes movement of the electrode to the weld area.

To allow initial insertion of the electrode 5 between the feed rolls 3 and 4, the single-pole, double-throw switch 51 is moved to the phantom line position shown in Fig. 3. The common pole 50 of switch 51 which is connected directly to the clutch solenoid 7 is then disposed in engagement with a contact 53 of switch 51. The contacts 53 are connected directly to the power line 43 and consequently the solenoid 7 is energized. The continued energization of solenoid 7 maintains the feed roll 4 in spaced relation to feed roll 3, generally in the same manner as the momentary energization previously described. The electrode may then be freely threaded between the feed rolls.

At the termination of the welding cycle, the apparatus of the invention prevents the electrode from being advanced toward the work by the inertia of the electrode feed motor and feed drive mechanism and thereby prevents the electrode from projecting beyond the end of the gun a distance which would necessitate trimming of the electrode prior to striking a subsequent arc. Furthermore, in those cases where the electrode cannot be diverted from the weld at the termination of the cycle, as it can be with the welding gun, the apparatus of the invention prevents the electrode from freezing to the weld.

The apparatus of the invention is particularly adapted to be used where a small diameter electrode, on the order of one-sixteenth of an inch in diameter, is fed at a rapid rate to the weld area. For example, feeding rates of one hundred inches per minute and more typically two hundred to four hundred inches per minute are not at all uncommon. Under such circumstances, the inertia of the feed mechanism and the electrode is correspondingly increased and, if not otherwise prevented, considerable coasting of the electrode is encountered.

The structure of the apparatus effectively and automatically prevents coasting of the electrode at the end of welding cycle. Furthermore, upon initiation of the subsequent weld, the electrode immediately starts to feed to the weld area.

Various modes of carrying out the invention are contemplated as being within the scope of the following claims particularly pointing out and distinctly claiming the subject matter which is regarded as the invention.

I claim:

1. In an apparatus for arc welding wherein a consumable electrode is fed toward a workpiece, drive means adapted to selectively engage and dis-engage said electrode, a prime mover, means to couple said prime mover to said drive means to feed the electrode to the workpiece, means operatively associated with the drive means and actuated at the termination of the welding cycle for disengaging said drive means and said electrode to prevent continued electrode feed due to inertia of the drive means and the prime mover, and timing means to de-actuate said last named means a predetermined time after said welding period is terminated to allow said drive means to re-engage said electrode prior to initiating a subsequent welding cycle, said last-named means being further actuated at the initiation of a subsequent welding cycle and adapted to over-ride said timing means to re-engage said drive means and said electrode to thereby feed the electrode to the workpiece simultaneously with the initiation of a subsequent welding cycle.

2. In an arc welding apparatus having a source of welding power connected to a consumable electrode and a workpiece and adapted to establish an electric arc therebetween, at least one pair of drive rolls disposed one each on opposite sides of said electrode and normally biased into driving engagement with said electrode, at least one of said drive rolls being movable out of engagement with said electrode, an electrode feed motor associated with said drive rolls to rotate said rolls to advance the electrode to the workpiece, switch means connected with said welding power source to simultaneously supply welding power across the electrode and the workpiece and to said motor, electrical energizable means operably associated with said switch means and actuated when said switch means is opened to temporarily move said movable drive roll out of engagement with said electrode to prevent coasting of the same due to the inertia of said drive rolls and feed motor, and timing means to de-energize said last-named means after said switch means is opened for a preselected period to allow said movable drive roll to re-engage said electrode.

3. In a device adapted to be employed with a welding machine to provide filler wire for welding, feed means adapted to selectively engage and dis-engage said filler wire and being normally disposed in engaging relationship with said filler wire, a motor adapted to drive said feed means to advance the filler wire to the work, electromagnetic means adapted to move said feed means out of engagement with said filler wire, an energizing circuit for said motor and said electromagnetic means, a switch in said energizing circuit adapted to be closed to simultaneously open the circuit to the motor and close the circuit to the electromagnetic means, and timing means in said energizing circuit to maintain said electromagnetic means energized for a predetermined time interval after said switch opens to hold said feed means out of engagement with said filler wire for said time interval.

4. In a gas-shielded consumable electrode arc-welding apparatus having a welding nozzle adapted to be connected to a source of cooling fluid for cooling of the nozzle and adapted to be connected to a source of shielding gas, feed means adapted to engage said electrode and drive the same during the welding cycle, means operatively associated with said feed means and adapted to be actuated at the termination and initiation of the welding cycle for moving said feed means out of and into engagement with said electrode respectively, and electrical timer means operable incident to terminating the welding cycle to maintain said nozzle operatively connected with said water and gas flow and to disengage said feed means and said electrode for a predetermined common period said last-named means over-riding said timer means when the former is actuated incident to initiating a subsequent welding cycle to insure electrode feed simultaneously with the initiation of said subsequent welding cycle.

5. In an apparatus for arc welding wherein a consumable electrode is fed through a hand gun toward a workpiece, drive means adapted to selectively engage and dis-engage said electrode, a prime mover, means to couple said prime mover to said drive means to feed the electrode to the workpiece, means operatively associated with the drive means and actuated at the termination of the welding cycle for disengaging said drive means and said electrode to prevent continued electrode feed due to inertia of the drive means and the prime mover, and timing means to de-actuate said last named means a predetermined time after said welding period is terminated to allow said drive means to re-engage said electrode prior to initiating a subsequent welding cycle, said last-named means being further actuated at the initiation of a subsequent welding cycle and adapted to over-ride said timing means to re-engage said drive means and said electrode to thereby feed the electrode to the workpiece simultaneously with the initiation of a subsequent welding cycle.

6. In a gas-shielded consumable electrode arc-welding apparatus having a welding nozzle adapted to be connected to a source of coolant for cooling of the nozzle and adapted to be connected to a source of shielding gas, the combination of at least one pair of drive rolls adapted to selectively engage and disengage said electrode, with at least one of said drive rolls being adapted to be moved out of engagement with said electrode, a feed motor associated with said drive rolls and adapted to drive the same to advance the filler wire to the weld area during the weld period, a solenoid adapted to be energized when the welding cycle is terminated and de-energized when a subsequent weld period is initiated, means actuated by said solenoid when the latter is energized to move one of said drive rolls out of engagement with said filler wire to prevent continued feed of the same due to the inertia of said feed motor, said means being de-actuated when said solenoid is de-energized to move said one drive roll into reengagement with said electrode, and timing means operable incident to the termination of the weld cycle to maintain said nozzle operatively connected to said coolant and shielding gas and to maintain said solenoid energized to hold one of said drive rolls out of engagement with said electrode for a predetermined common period, the last-named means over-riding said timing means incident to initiating a subsequent weld period to positively feed the electrode to the weld area simultaneously with the initiation of said subsequent weld period.

7. In a device for feeding filler wire to the weld area including a semi-automatic welding head provided with a manually operable switch, an electric circuit for controlling the welding operation and adapted to be opened and closed by said switch, a pair of feed rolls, a motor associated with said electric circuit and said feed rolls for driving said feed rolls when the electric circuit is closed, a solenoid in said circuit and adapted to be energized when said circuit is opened, said solenoid having a movable solenoid core, means associated with said solenoid core for dis-engaging at least one of said feed rolls from the filler wire when said circuit is opened and said solenoid is energized, and a timing device in said circuit and actuated a predetermined time interval after said circuit is opened to de-energize said solenoid to allow said feed roll to re-engage said filler wire prior to initiating a subsequent weld.

8. In an arc welding apparatus having a source of welding power connected to a consumable electrode and a workpiece and adapted to establish an electric arc therebetween, drive means adapted to selectively engage and disengage said electrode with said drive means normally disposed in engagement with said electrode, a prime mover, means for coupling said prime mover to said drive means to feed the electrode to the workpiece, switch means connected with said welding power source to simultaneously supply welding power across the electrode and to said drive means, and electrical energizable means operably associated with said switch means and actuated when said switch means is opened to move said drive means out of engagement with said electrode to prevent coasting of the same.

9. In a gas-shielded consumable electrode arc-welding apparatus having a welding nozzle adapted to be connected to a source of cooling fluid for cooling of the nozzle and adapted to be connected to a source of shielding gas, feed means adapted to engage said electrode and feed the same during the welding cycle, electrically energizable means operatively associated with said feed means for moving the same out of engagement with the electrode, an energizing circuit for said feed means and said electrically energizable means, a switch in said energizing circuit adapted to be closed to simultaneously open the circuit to the feed means and close the circuit to the electrically energizable means, and timer means operable incident to closing said switch to maintain said nozzle operatively connected with said water and gas flow and to maintain the circuit to said electrically energizable means closed for a predetermined common period.

References Cited in the file of this patent

UNITED STATES PATENTS

| 1,392,436 | Morton | Oct. 4, 1921 |
| 1,731,502 | Paterson | Oct. 15, 1929 |
| 2,510,207 | Behnke et al. | June 6, 1950 |